United States Patent Office 3,526,629
Patented Sept. 1, 1970

3,526,629
β-HYDROXYETHYLPIPERAZINOCARBOXY-
METHYL - 7 - DIMETHYLAMINO - 6 - DE-
OXY-6-DEMETHYLTETRACYCLINE
Michael Joseph Martell, Jr., Pearl River, N.Y., and James Howard Boothe, Montvale, N.J., assignors to American Cyanamid Company, Stamford, Conn., a corporation of Maine
No Drawing. Continuation-in-part of application Ser. No. 632,522, Apr. 21, 1967. This application Apr. 2, 1968, Ser. No. 718,196
Int. Cl. C07d 51/70
U.S. Cl. 260—268          1 Claim

ABSTRACT OF THE DISCLOSURE

This disclosure describes β-hydroxyethylpiperazinocarboxymethyl - 7 - dimethylamino-6-deoxy-6-demethyltetracycline; therapeutic compositions containing this compound; and methods of treating bacterial infections in mammals therewith.

CROSS REFERENCE TO RELATED APPLICATION

This application is a continuation-in-part of our copending application Ser. No. 632,522, filed Apr. 21, 1967, now abandoned.

BRIEF SUMMARY OF THE INVENTION

This invention relates to new compositions of matter for combating bacterial infections in mammals. More particularly, it relates to therapeutic compositions containing β-hydroxyethylpiperazinocarboxymethyl - 7 - dimethylamino-6-deoxy-6-demethyltetracycline useful for the treatment of bacterial infections. The invention includes the novel compound, the new compositions of matter, and methods of combating bacterial infections in mammals therewith.

Our invention is based upon the discovery that β-hydroxyethylpiperazinocarboxymethyl - 7 - dimethylamino-6-deoxy-6-demethyltetracycline possesses excellent activity as an antibacterial agent. This novel compound, the active component of the novel compositions of the present invention, may be represented by the following structural formula:

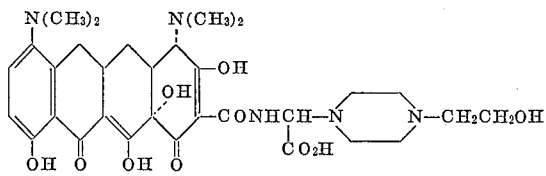

DETAILED DESCRIPTION OF THE INVENTION

The novel compound of the present invention forms anionic and cationic salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic and related acids. Base-derived salts formed by admixture of the organic free base with a base suitably in a neutral solvent, are formed with such bases as sodium hydroxide, potassium hydroxide, calcium hydroxide, magnesium hydroxide, tetraethylammonium hydroxide, etc. For purposes of this invention, β-hydroxyethylpiperazinocarboxymethyl-7-dimethylamino-6-deoxy - 6 - demethyltetracycline is equivalent to its anionic and cationic salts.

The novel compound of the present invention has a number of unique physiological properties not shared by the parent antibiotic and derivatives thereof. It appears to be well absorbed from the gastrointestinal tract and is particularly well adapted for parenteral administration, providing higher serum levels than the parent antibiotic when administered intramuscularly. The anionic and cationic salts of β-hydroxyethylpiperazinocorboxymethyl - 7 - dimethylamino - 6 - deoxy-6-demethyltetracycline are more soluble in both water and hydroxylic organic solvents such as lower alkanols, propylene glycol, glycerol and the like than is the free base form. The anionic and cationic salts are also well absorbed from the gastrointestinal tract and provide satisfactory antibiotic blood levels upon either oral or parenteral administration.

The novel compound of the present invention may be readily prepared by the reaction of 7-dimethylamino-6-deoxy-6-demethyltetracycline with glyoxylic acid and N-(β-hydroxyethyl)piperazine. The reaction is carried out by merely contacting the tetracycline starting material with glyoxylic acid and N-(β-hydroxyethyl)piperazine in an organic solvent such as dioxane, tetrahydrofuran, acetone, β-methoxyethanol, dimethylsulfoxide, dimethylformamide, methyl cellosolve, and the like. It is preferred to employ sufficient solvent to maintain the tetracycline starting material in solution when added to the reaction medium. The reagents may be added simultaneously or individually, in any order. It is generally preferred to add the 7-dimethylamino-6-deoxy-6-demethyltetracycline to a solution of glyoxylic acid and N-(β-hydroxyethyl)piperazine since best results are thus obtained. Efficient mechanical mixing of the reaction medium, while not essential, is found particularly helpful during the addition of the tetracycline starting material. The reaction is ordinarily carried out at room temperature over a period of time of about two hours or so.

The reagents are preferably employed in substantially equimolar ratio. Although excesses of the glyoxylic acid and N-(β-hydroxyethyl)piperazine may be employed, no substantial advantage is realized in so doing. The product separates from the reaction mixture, upon cooling, as a solid which may be recrystallized by conventional procedures. Also, the addition of the reaction mixture to a mechanically agitated non-solvent precipitates the solid product. Suitable non-solvents are tert.-butyl alcohol, diethyl ether, toluene, hexane, and the like. Various forms of the 7-dimethylamino-6-deoxy-6-demethyltetracycline starting material may be employed in the present process, for example, acid-addition salts as well as the free base in either hydrated or anhydrous form. The N-(β-hydroxyethyl)piperazine may be utilized as the acid-addition salt or as the free base, and glyoxylic acid is best employed as the monohydrate. If a salt of either the tetracycline starting material or the N(β-hydroxyethyl)piperazine is used, it is generally preferred to employ mineral acid salts, exemplified by the hydrochloride salts, since these are readily available and give excellent results. These, of course, include phosphoric, sulfuric, nitric, hydrobromic and the like, in addition to hydrochloric acid salts. In all cases these salts must be neutralized by the addition of some appropriate base to the reaction medium.

β-hydroxyethylpiperazinocarboxymethyl - 7 - dimethylamino-6-deoxy-6-demethyltetracycline is biologically active and has been found to possess broad spectrum antibacterial activity. The antibacterial spectrum of this novel compound, representing the amount required to inhibit the growth of various typical bacteria, was determined in a standard manner by the agar dilution streak technique as follows. In the assay, the compound to be tested is first dissolved in dimethyl sulfoxide at a concentration of 10 mg./ml. Serial tenfold dilutions are then made from this initial stock solution and 0.2, 0.1 and 0.05 ml. volumes of the solution are mixed with 10 ml. volumes of fluid, warm (45° C.) trypticase-soy agar. The agar dilutions containing the compound are allowed to harden in petri dishes and 1:10 dilutions of overnight broth cultures of the various test cultures are applied to the surfaces. The plates are then incubated at 37° C. After 24 hours, the plates are examined and endpoints of activity recorded as the lowest concentrations of test compound preventing growth. The minimal inhibitory concentrations, expressed in micrograms per milliliter, of β-hydroxyethylpiperazinocarboxymethyl - 7 - dimethylamino-6-deoxy-6-demethyltetracycline (1) against various test organisms are set forth in Table I below as compared with 7-dimethylamino - 6 - deoxy-6-demethyltetracycline hydrochloride (2) and tetracycline hydrochloride (3) as reference standards.

TABLE I

| Organism | Minimal Inhibitory conc. (mcg./ml.) | | |
|---|---|---|---|
| | (1) | (2) | (3) |
| Bacillus cereus ATCC 10702 | 0.5 | 0.2 | 0.2 |
| Bacillus subtilis ATCC 6633 | 0.5 | 0.2 | 0.5 |
| Corynebacterium xerosis NRRL-B1397 | 1.0 | 0.5 | 2.0 |
| Mycobacterium smegmatis ATCC 607 | 0.5 | 0.5 | 1.0 |
| Staphylococcus aureus 69 | 50 | 10 | >200 |
| Staphylococcus aureus Rose ATCC 14154 | 10 | 5 | 200 |
| Staphylococcus aureus Smith ATCC 13709 | 1.0 | 1.0 | 2.0 |
| Staphylococcus aureus 4050B122-3 | 10 | 5 | 100 |
| Streptococcus faecalis ATCC 8043 | 2.0 | 0.5 | 2.0 |
| Streptococcus sp., β hemolytic 80 | >200 | 100 | >200 |
| Streptococcus pyogenes C203 | 1.0 | 1.0 | 2.0 |
| Enterobacter aerogenes 75 | 50 | 50 | 10 |
| Escherichia coli U311 | 10 | 5 | 10 |
| Escherichia coli U311 DY | 200 | 50 | >200 |
| Escherichia coli ATCC 9637 | 50 | 10 | 20 |
| Klebsiella pneumoniae AD | 10 | 5 | 5 |
| Klebsiella pneumoniae ATCC 10031 | 5 | 1.0 | 5 |
| Pasteurella multocida 310, ATCC 8369 | 1.0 | 0.5 | 1.0 |
| Proteus vulgaris ATCC 9484 | 5 | 5 | 20 |
| Pseudomonas aeruginosa ATCC 10145 | 100 | 50 | 20 |
| Salmonella cholerasuis ATCC 10708 | 20 | 10 | 10 |
| Salmonella typhosa ATCC 6539 | 20 | 10 | 10 |
| Shigella flexneri | 10 | 5 | 10 |
| Shigella shiga | 10 | 5 | 10 |

The high in vitro antibacterial activity of the novel compound of the present invention makes it useful as an additive to materials which are subject to microbial deterioration such as cutting oils and fuel oils. It is also useful in soaps, shamposs, and topical compositions for the treatment of wounds and burns.

The novel compound of the present invention has also been found to be highly active in vivo against *Staphylococcus aureus*, strain Smith, ATCC 13709 and *Staphylococcus aureus*, strain Rose, ATCC 14154 infections in mice.

*Staphylococcus aureus*, strain Smith, ATCC 13709 has been studied at the Rockefeller Institute and has been described by J. M. Smith and R. J. Dubos in the Journal of Experimental Medicine 108, 87 (1956). This organism is coagulase positive, tellurite negative, and is sensitive to tetracycline, penicillin, streptomycin, erythromycin, carbomycin, neomycin, chloramphenicol and novobiocin in vitro. Attempts have been made for phage typing of this strain, but it has been determined that it is nontypable.

*Staphylococcus aureus*, strain Rose, ATCC 14154 was isolated clinically from an abscess of a patient who did not respond to treatment with the tetracyclines and has been described by G. S. Redin and M. E. McCoy in Antibiotics Annual 1959–1960, pp. 213–219. This organism has been found to be resistant to the clinically used tetracyclines in vitro and in vivo. *Staphylococcus aureus*, strain Rose, ATCC 14154 is coagulase and tellurite positive and is resistant to tetracycline, penicillin, streptomycin and erythromycin. It is sensitive to carbomycin, neomycin, chloramphenicol and novobiocin in vitro. *Staphylococcus aureus*, strain Rose, ATCC 14154 has been phage-typed with the following results: Phage pattern 80/81.

The in vivo activity of the novel compound of this invention was demonstrated by experiments carried out as follows: Unit test groups consist of 5 or 10 Carworth Farms CF1 female mice approximately 6 weeks old and averaging 18 to 22 grams of body weight per mouse. Infections are produced by intraperitoneal injections of 0.5 milliliter volumes of a $10^{-2}$ trypticase soy broth (TSP) dilution of a 5 hour blood broth culture of *Staphylococcus aureus*, strain Smith, ATCC 13709 or *Staphylococcus aureus*, strain Rose, ATCC 14154, containing $15 \pm 10 \times 10^6$ viable units as determined by plate counts. The compound mixed in 0.2% aqueous agar is administered by a single oral tubing dose or a single subcutaneous injection in 0.5 ml. volumes to each test mouse one hour after infection. Control mice received 0.5 ml. volumes of 0.2% aqueous agar without the compound in like manner. The results obtained when β-hydroxyethylpiperazinocarboxymethyl - 7-dimethylamino - 6-deoxy - 6-demethyltetracycline (1) was so tested are set forth in Table II and Table III below as compared with 7-dimethylamino-6-deoxy - 6-demethyltetracycline hydrochloride (2) and tetracycline hydrochloride (3) as reference standards.

TABLE II.—STAPHYLOCOCCUS AUREUS, STRAIN SMITH, ATCC 13709 INFECTIONS IN MICE

| Dose, mg./kg. of body weight (single subcutaneous) | Mice alive/mice tested 14 days after infection [1] | | |
|---|---|---|---|
| | (1) | (2) | (3) |
| 8 | 20/20 | 10/10 | 20/20 |
| 4 | 19/20 | 10/10 | 15/20 |
| 2 | 5/20 | 13/20 | 8/20 |
| 1 | 4/20 | 12/20 | 3/20 |
| 0.5 | 3/20 | 6/20 | 0/20 |
| 0.25 | 4/20 | 1/20 | |
| 0.12 | 0/10 | 0/10 | |

[1] 38/40 untreated infected control mice died within one day.

TABLE III.—STAPHYLOCOCCUS AUREUS, STRAIN ROSE, ATCC 14154 INFECTIONS IN MICE

| Dose, mg./kg. of body weight (single oral tubing) | Mice alive/mice tested 14 days after infection [1] | | |
|---|---|---|---|
| | (1) | (2) | (3) |
| 32 | 20/20 | 10/10 | [2] |
| 16 | 15/20 | 10/10 | |
| 8 | 10/20 | 16/20 | |
| 4 | 5/20 | 5/20 | |
| 2 | 2/20 | 6/20 | |
| 1 | 0/10 | 0/20 | |

[1] 38/40 untreated infected control mice died within one day.
[2] Tetracycline hydrochloride is inactive in this test at dose levels up to 1,000 mg./kg.

The β-hydroxyethylpiperazinocarboxymethyl - 7 - dimethylamino - 6-deoxy-6-demethyltetracycline has been found to be highly useful in the treatment of bacterial infections in mammals when administered in amounts ranging from about 2 mg. to about 200 mg. per kg. of body weight per day. A dosage unit for optimum results would be from about 5 mg. to about 50 mg. per kg. of body weight per day and such dosage units are employed that a total of from about 0.05 g. to about 5.0 g. of the compound are administered orally in a 24 hour period.

The dosage units of the compound may contain other inert or medically active materials, for instance, when the dosage unit form is a tablet, pill or granules, there may be present various binders, fillers, or solid diluents. Suitable materials for this purpose may be, for example, starch such as corn starch, or sugar such as lactose or sucrose. There may also be present various medically active materials, for example, aspirin. When the dosage unit form is a capsule, it may contain in addition to materials of the above type a liquid carrier such as a fatty oil. The dosage unit form may also have present various flavors, oil of wintergreen, and excipients such as dicalcium phosphate. Various other materials may be present as coatings or to otherwise modify the physical form of the dosage unit, for instance, pills or capsules may be coated with shellac, sugar or both. Of course, any material used in preparing the dosage unit form must be substantially non-toxic in the amounts employed. The β-hydroxyethylpiperazinocarboxymethyl -7-dimethylamino-6-deoxy - 6-demethyltetracycline may also be administered parenterally by dissolving or suspending the compound in a parenterally suitable vehicle such as, for example, propylene glycol or polyethylene glycol, or by dissolving or suspending the compound in an aqueous solution of such vehicle.

The invention will be described in greater detail in conjunction with the following specific examples.

EXAMPLE 1

Preparation of 7-dimethylamino-6-deoxy-6-demethyltetracycline

A solution of 278.7 mg. of 7-nitro-6-deoxy-6-demethyltetracycline sulfate in 15 ml. of 93% methyl cellosolve (7% water), 0.75 ml. of 40% aqueous formaldehyde solution and 50 mg. of 10% palladium-on-carbon catalyst was hydrogenated at room temperature and atmospheric pressure. Uptake of hydrogen was four equivalents in two hours. After removal of the catalyst by filtration, the solution was poured into 300 ml. of dry diethyl ether. The precipitate was collected by filtration, washed well with dry diethyl ether, and dried; weight of product, 200 mg.

EXAMPLE 2

Preparation of 7-dimethylamino-6-deoxy-6-demethyltetracycline

A solution of 527 mg. of 7-amino-6-deoxy-6-demethyltetracycline sulfate, 0.25 ml. of 97% formic acid, and 0.2 ml. of 37% aqueous formaldehyde solution was heated to reflux for two hours. The cooled mixture was taken up in 100 ml. of water. Paper chromatography revealed the presence of 7-dimethylamino-6-deoxy-6-demethyltetracycline.

EXAMPLE 3

Preparation of β - hydroxyethylpiperazinocarboxymethyl-7-dimethylamino-6-deoxy-6-demethyltetracycline To a solution of 35 mg. of N-(β-hydroxyethyl)piperazine in 3 ml. of methyl cellosolve was added 110 mg. of 7-dimethylamino-6-deoxy-6-demethyltetracycline and 25 mg. of glyoxylic acid monohydrate. The solution was stirred at room temperature for 100 minutes, filtered, and poured slowly into 15 ml. of stirred dry diethyl ether. The resulting yellow precipitate was filtered, washed with dry diethyl ether and finally washed with Skellysolve B. The dried material weighed 84 mg. Thin layer chromatography [chloroform (3) methanol (1)] showed a new spot at $R_fO$, corresponding to product.

We claim:
1. A compound selected from the group consisting of β - hydroxyethylpiperazinocarboxymethyl - 7 - dimethylamino - 6 - deoxy-6-demethyltetracycline and the anionic and cationic salts thereof.

References Cited

UNITED STATES PATENTS

| | | | |
|---|---|---|---|
| 3,148,212 | 9/1964 | Boothe et al. | 260—559 |
| 3,456,007 | 7/1969 | Rondelet | 260—559 |

ALEX MAZEL, Primary Examiner

A. M. T. TIGHE, Assistant Examiner

U.S. Cl. X.R.

260—559; 424—200, 227